(12) United States Patent
Silverbrook et al.

(10) Patent No.: US 7,290,210 B2
(45) Date of Patent: *Oct. 30, 2007

(54) METHOD AND SYSTEM FOR CAPTURING A NOTE-TAKING SESSION USING CODED MARKS

(75) Inventors: Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 375 days.

This patent is subject to a terminal disclaimer.

(21) Appl. No.: 10/291,822

(22) Filed: Nov. 12, 2002

(65) Prior Publication Data

US 2003/0106020 A1    Jun. 5, 2003

Related U.S. Application Data

(63) Continuation of application No. 09/721,894, filed on Nov. 25, 2000, now abandoned.

(30) Foreign Application Priority Data

Feb. 24, 2000   (AU) .................................. PQ5829

(51) Int. Cl.
*G06F 15/00* (2006.01)
(52) U.S. Cl. ............... 715/541; 715/512; 345/173; 345/179; 382/187; 382/188
(58) Field of Classification Search ........... 715/541, 715/512; 382/187–188; 345/173, 179, 156–157, 345/176
See application file for complete search history.

(56) References Cited

U.S. PATENT DOCUMENTS 4,864,618 A    9/1989   Wright et al.
5,051,736 A    9/1991   Bennett et al.
5,347,295 A *  9/1994   Agulnick et al. ........... 345/156

(Continued)

FOREIGN PATENT DOCUMENTS

EP    0805410 A    11/1997

(Continued)

OTHER PUBLICATIONS

"CossPad", copyright 1998, pp. 1-5.*

(Continued)

*Primary Examiner*—Stephen Hong
*Assistant Examiner*—Thu V. Huynh

(57) ABSTRACT

A system and method capturing, in a computer system, data relating to a note-taking session, the session consisting of handwritten annotations made by a user by way of a writing implement on a plurality of pages. The method includes the steps of receiving, in the computer system and via the writing implement, an indication of the start of the note-taking session, data indicative of the handwritten annotations made by said user on the plurality of pages, an indication of the end of the note-taking session, and retaining a retrievable record of the received data for the note-taking session. Starting, ending and printing a note-taking session takes place by way of printed command buttons for designation by the writing implement, which buttons may be printed on each page, or on a part of a backing sheet of a notepad of pages extending beyond the periphery of the pages themselves.

31 Claims, 23 Drawing Sheets

U.S. PATENT DOCUMENTS

| | | | |
|---|---|---|---|
| 5,432,525 A | 7/1995 | Maruo et al. | |
| 5,477,012 A | 12/1995 | Sekendur | |
| 5,533,141 A | 7/1996 | Futatsugi et al. | |
| 5,535,063 A | 7/1996 | Lamming | |
| 5,544,358 A * | 8/1996 | Capps et al. | 715/523 |
| 5,625,833 A | 4/1997 | Levine et al. | |
| 5,652,412 A | 7/1997 | Lazzouni | |
| 5,661,506 A | 8/1997 | Lazzouni et al. | |
| 5,692,073 A | 11/1997 | Cass | |
| 5,717,879 A | 2/1998 | Moran et al. | |
| 5,781,914 A | 7/1998 | Stork et al. | |
| 5,845,161 A | 12/1998 | Schrock et al. | |
| 5,852,434 A | 12/1998 | Sekendur | |
| 5,959,615 A | 9/1999 | Yamade et al. | |
| 5,996,002 A | 11/1999 | Katsurabayashi et al. | |
| 6,076,734 A | 6/2000 | Dougherty | |
| 6,081,261 A * | 6/2000 | Wolff et al. | 345/179 |
| 6,144,380 A * | 11/2000 | Shwarts et al. | 715/863 |
| 6,201,948 B1 | 3/2001 | Cook et al. | |
| 6,326,957 B1 * | 12/2001 | Nathan et al. | 345/179 |
| 6,330,976 B1 * | 12/2001 | Dymetman et al. | 235/487 |
| 6,446,871 B1 | 9/2002 | Buckley et al. | |
| 6,452,615 B1 | 9/2002 | Chiu et al. | |
| 6,456,740 B1 * | 9/2002 | Carini et al. | 382/187 |
| 6,476,834 B1 * | 11/2002 | Doval et al. | 715/863 |
| 6,529,920 B1 * | 3/2003 | Arons et al. | 715/500.1 |
| 6,616,702 B1 | 9/2003 | Tonkin | |
| 6,665,490 B2 * | 12/2003 | Copperman et al. | 386/95 |
| 6,697,056 B1 * | 2/2004 | Bergelson et al. | 345/178 |
| 6,806,867 B1 * | 10/2004 | Arruda et al. | 345/173 |
| 6,964,374 B1 | 11/2005 | Djuknic et al. | |
| 2002/0146170 A1 * | 10/2002 | Rom | 382/175 |
| 2006/0031764 A1 * | 2/2006 | Keyser et al. | 715/525 |

FOREIGN PATENT DOCUMENTS

| | | |
|---|---|---|
| EP | 0929046 A | 7/1999 |
| GB | 2306669 | 5/1997 |
| WO | WO 97/22959 A | 6/1997 |
| WO | WO 98/14888 A | 4/1998 |
| WO | WO 99/18487 | 4/1999 |
| WO | WO 99/39277 A | 8/1999 |
| WO | WO 99/50787 | 10/1999 |

OTHER PUBLICATIONS

"Cross Pen computing Group Ships the CrossPad the World's First Portable Digital Notepad", Mar. 1998, pp. 1-2.*

Dymetman, M., and Copperman, M., Intelligent Paper, In Electronic Publishing, Artistic Imaging, and Digital Typography, Proceedings of EP '98, Mar./Apr. 1998, Springer Verlag LNCS 1375, pp. 392-406.

Crosspad, copyright 1998, pp. 1-5.

"Cross Pen Computing Group Ships the CrossPad the World's First Portable Ditital Notepad", Mar. 1998, pp. 1-2.

* cited by examiner

BOOK A CONFERENCE SESSION ⌐ `DATE TIME` ¬

TO BOOK A NEW CONFERENCE SESSION, COMPLETE THESE DETAILS:

SESSION DESCRIPTION [SESSION DESC]

SESSION DATE [START DATE]

FROM [START TIME] TO [END TIME]

---

INVITE: (ADD INVITEES) ~533    CHAIR PERSON    OBSERVE ONLY

[INVITEE]  ☐ ☐
[INVITEE]  ☐ ☐
[INVITEE]  ☐ ☐

---

CONFERENCE SESSION PURPOSE

[SESSION PURPOSE]
[SESSION PURPOSE]
[SESSION PURPOSE]

519

534 ~(SEND INVITATION)

*FIG. 16*

CONFERENCE SESSION CONTROL PAGE | DATE TIME |

SESSION DESCRIPTION | SESSION DESC |

SESSION DATE | START DATE |

FROM | START TIME | TO | END TIME |

CHAIRPERSON | NAME |

PARTICIPANTS | LEVEL

| NAME | | ACCESS |
| NAME | | ACCESS |

| NAME | | ACCESS |

MARKUP SESSION PURPOSE

| SESSION PURPOSE |
| SESSION PURPOSE |
| SESSION PURPOSE |

522

SESSION ACTIONS  535  537
( START SESSION )  536  ( VIEW HISTORY )
( END SESSION )  ( VIEW MESSAGES )

FIG. 17

CONFERENCE SESSION END NOTICE  DATE TIME

SESSION DESCRIPTION  SESSION DESC
SESSION STARTED AT  START DATE  START TIME
SESSION ENDED AT  END TIME
CHAIRPERSON  USER NAME

PARTICIPANTS                LEVEL
NAME                        ACCESS
NAME                        ACCESS

NAME                        ACCESS

MARKUP SESSION PURPOSE
SESSION PURPOSE
SESSION PURPOSE
SESSION PURPOSE

```
COMPOSE MESSAGE                    DATE TIME

MESSAGE TO
    ☐  ALL PARTICIPANTS
    ☐  NAME                        ACCESS
    ☐  NAME                        ACCESS

☐  NAME                        ACCESS

SUBJECT:  SUBJECT
MESSAGE:

MESSAGE

530                                  SEND
```

FIG. 21

METHOD AND SYSTEM FOR CAPTURING A NOTE-TAKING SESSION USING CODED MARKS

CROSS-REFERENCE TO RELATED APPLICATION

This is a Continuation Application of U.S. application Ser. No. 09/721,894 filed on Nov. 25, 2000 now abandoned.

FIELD OF INVENTION

The present invention relates generally to computing systems and, more particularly, to a method and system for capturing, in a computer system, data relating to a note-taking session. The system and method of the invention are suitable for use in, for example, an educational environment or a meeting environment.

CO-PENDING APPLICATIONS

Various methods, systems and apparatus relating to the present invention are disclosed in the following co-pending applications/granted patents filed by the applicant or assignee of the present invention on Nov. 25, 2000:

| | | | | | |
|---|---|---|---|---|---|
| 6530339 | 6631897 | 09/721895 | 09/722174 | 09/721896 | 7064851 |
| 6826547 | 6741871 | 6927871 | 6980306 | 6965439 | 6788982 |
| 09/722141 | 6788293 | 6946672 | 7091960 | 6792165 | 7105753 |
| 09/721862 | | | | | |

The disclosures of these co-pending applications are incorporated herein by cross-reference.

Various methods, systems and apparatus relating to the present invention are disclosed in the following co-pending applications/granted patents filed by the applicant or assignee of the present invention on Oct. 20, 2000:

| | | | | | |
|---|---|---|---|---|---|
| 09/693415 | 7110126 | 6813558 | 6965454 | 6847883 | 09/693647 |
| 09/693690 | 6982798 | 6474888 | 6627870 | 6724374 | 09/693514 |
| 6454482 | 6808330 | 6527365 | 6474773 | 6550997 | |

The disclosures of these co-pending applications are incorporated herein by cross-reference.

Various methods, systems and apparatus relating to the present invention are disclosed in the following co-pending applications/granted patents filed by the applicant or assignee of the present invention on Sep. 15, 2000:

| | | | |
|---|---|---|---|
| 6679420 | 6963845 | 6995859 | 6720985 |

The disclosures of these co-pending applications are incorporated herein by cross-reference.

Various methods, systems and apparatus relating to the present invention are disclosed in the following co-pending applications/granted patents filed by the applicant or assignee of the present invention on Jun. 30, 2000:

| | | | | | |
|---|---|---|---|---|---|
| 6824044 | 6678499 | 6976220 | 6976035 | 6766942 | 09/609303 |
| 6922779 | 6978019 | 09/607843 | 6959298 | 6973450 | 09/609553 |
| 6965882 | 09/608022 | 7007851 | 6957921 | 6457883 | 6831682 |
| 6977751 | 6398332 | 6394573 | 6622923 | | |

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

| | | | | | |
|---|---|---|---|---|---|
| 6428133 | 6526658 | 6315399 | 6338548 | 6540319 | 6328431 |
| 9328425 | 6991320 | 6383833 | 6464332 | 6390591 | 7018016 |
| 9328417 | 09/575197 | 7079712 | 09/575123 | 6825945 | 09/575165 |
| 6813039 | 6987506 | 70038797 | 6980318 | 6816274 | 7102772 |
| 09/575186 | 66810445 | 6728000 | 09/575145 | 7088459 | 09/575181 |
| 7068382 | 7062651 | 6789194 | 6789191 | 6644642 | 6502614 |
| 6622999 | 6669385 | 6549935 | 6987573 | 6727996 | 6591884 |
| 6439706 | 6760119 | 09/575198 | 6290349 | 6428155 | 6785016 |
| 6870966 | 6822639 | 6737591 | 7055739 | 09/575129 | 6830196 |
| 6832717 | 6957768 | 09/575162 | 09/575172 | 09/575170 | 7106888 |
| 7123239 | 6409323 | 6281912 | 6604810 | 6318920 | 6488422 |
| 6795215 | 09/575109 | 6859289 | | | |

The disclosures of these co-pending applications are incorporated herein by cross-reference.

BACKGROUND

Remote whiteboard computer systems are already established. Such interactive systems allow participants in mutually disparate geographical locations to participate in a collaborative activity in real time. Generally each participant has access to a computer means that is networked with the computers of the other participants. A display device accessible to each participant acts as a 'virtual whiteboard', allowing the participants to submit and receive drawings and alternative graphical or other information. Each participant may have a copy of a common drawing on his or her virtual whiteboard, and can edit or otherwise amend that drawing, such 'markups' being immediately transmitted to the other participants to maintain in a consistent state the common drawing.

Additionally, conventional whiteboards are also commonly used in educational environments, to facilitate the transfer of information from teacher to student, and in group discussions such as business meetings, where ideas need to be communicated between participants. The whiteboard provides a convenient surface on which concepts can be graphically expressed, by way of notes, drawings, charts, etc. Such notations can be made in selected colors and can be readily erased from the smooth, wipeable surface.

Electronic whiteboards which have been developed allow representations of notations made upon a specially designed whiteboard to be transmitted to a computer for storage, display, transmission, printing, etc. During a meeting session, graphical user input entered on the electronic whiteboard is digitized and stored in a file, and dedicated whiteboard application software enables retrieval and manipulation. At any time, stored session files may be retrieved to view or print the information, or to copy it to other applications if required. To this end, the whiteboard surface generally includes a writing/drawing region, and a control region providing means for inputting control commands via the whiteboard.

SUMMARY OF INVENTION

It is an objective of the present invention to provide a new method and system for capturing, in a computer system, data relating to a note-taking session.

The present invention provides, in a first aspect, a method of capturing, in a computer system, data relating to a note-taking session, the session consisting of handwritten annotations made by a user by way of a writing implement on a plurality of pages, the method including the steps of:

receiving, in the computer system and via the writing implement, an indication of the start of the note-taking session;

receiving, in the computer system and via the writing implement, data indicative of said handwritten annotations made by said user on said plurality of pages;

receiving, in the computer system and via the writing implement, an indication of the end of the note-taking session; and retaining a retrievable record of the received data for the note-taking session.

According to the invention in a second aspect, there is provided a system for capturing data relating to a note-taking session, the session consisting of handwritten annotations made by a user by way of a writing implement on a plurality of pages, the system including:

a computer system for receiving indicating data via the writing implement operated by the user, said indicating data regarding the position of the writing implement relative to a page, the computer system including (a) means for identifying, from the indicating data, an indication of the start of the note-taking session and an indication of the end of the note-taking session; and (b) storage means for retaining a retrievable record of the received data for the note-taking session, said retrievable record being indicative of said handwritten annotations made by said user on said plurality of pages between the start and end of the note-taking session.

Accordingly, the present invention provides a system and a method which utilizes one or more forms capable of interacting with a computer system. Whilst the novel method and system of the present invention may be used in conjunction with a single computer system, it is also readily adapted to operate by means of a computer network, such as the Internet.

Physically, the form is disposed on a surface medium of any suitable structure. However, in a preferred arrangement, the form is disposed on sheet material such as paper or the like which has the coded data printed on it and which allows interaction with the computer system. The coded data is detectable preferably, but not exclusively, outside the visible spectrum, thereby enabling it to be machine-readable but substantially invisible to the human eye. The form may also include visible material which provides information to a user, such as the application or purpose of the form, and which visible information may be registered or correlate in position with the relevant hidden coded data.

The system also includes a sensing device to convey data from the form to the computer system, and in some instances, to contribute additional data. Again, the sensing device may take a variety of forms but is preferably compact and easily portable. In a particularly preferred arrangement, the sensing device is configured as a pen which is designed to be able to physically mark the interactive form as well as to selectively enable the coded data from the form to be read and transmitted to the computer system. The coded data then provides control information, configured such that designation thereof by a user causes instructions to be applied to the software running on the computer system or network.

The nature of the interaction between the form and the sensing device and the data that each contributes to the computer system may vary. In one arrangement, the coded data on the form is indicative of the identity of the form and of at least one reference point on that form. In another embodiment, the interactive form includes coded data which is indicative of a parameter of the form, whereas the sensing device is operative to provide data regarding its own movement relative to that form to the computer system together with coded data from the form. In yet another arrangement, the form includes the coded data which at least identifies the form, and the sensing device is designed to provide, to the computer system, data based on the form coded data, and also on data which identifies the user of the device.

The system and method employs specially designed printers to print the interactive form. Further these printers constitute or form part of the computer system and are designed to receive data from the sensing device. As indicated above, the system and method of the invention is ideally suited to operate over a network. In this arrangement, the printers are fully integrated into the network and allow for printing of the interactive forms on demand and also for distributing of the forms using a mixture of multi-cast and point-cast communication protocols.

Accordingly, in a preferred form, the present invention provides methods and systems which use a paper and pen based interface for a computer system. This provides many significant benefits over traditional computer systems. The advantage of paper is that it is widely used to display and record information. Further, printed information is easier to read than information displayed on a computer screen. Moreover, paper does not run on batteries, can be read in bright light, or robustly accepts coffee spills or the like and is portable and disposable. Furthermore, the system allows for hand-drawing and hand-writing to be captured which affords greater richness of expression than input via a computer keyboard and mouse.

The present invention therefore provides a method and system for capturing, in a computer system, data relating to a note-taking session, making use of novel interactive surface media. It is to be understood in this specification and claims that the term 'note-taking session' refers to any session during which pages are annotated for presentation purposes. In particular, in carrying out the method of the invention, a notepad, (or 'whiteboard pad'), is employed to convey information.

Using the invention, participants can communicate graphical ideas on a whiteboard or similar, using interactive surface media. The whiteboard can take the form of a pad of large-format pre-printed pages supported for easy viewing on an easel. Multiple colored pens can be used during a whiteboard session, and the colors used can be reproduced on subsequently printed versions of the pages of a whiteboard session.

Each printed version of page can be timestamped and marked with the name of the author, if desired.

BRIEF DESCRIPTION OF DRAWINGS

Preferred and other embodiments of the invention will now be described, by way of non-limiting example only, with reference to the accompanying drawings, in which:

FIG. 5c is a plan view showing an arrangement of nine of the tags shown in FIG. 5a where targets are shared between adjacent tags;

FIG. 5d is a plan view showing the interleaving and rotation of the symbols of the four codewords of the tag shown in FIG. 5a;

FIG. 16 shows the book a conference session page;

FIG. 17 shows the conference session control page;

FIG. 20 shows the conference session end notice;

FIG. 21 shows the compose message page;

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular applications U.S. Ser. No. 09/575,129, U.S. Pat. Nos. 6,870,966, 6,727,996, U.S. Ser. No. 09/575,195 and U.S. Pat. No. 6,428,133. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
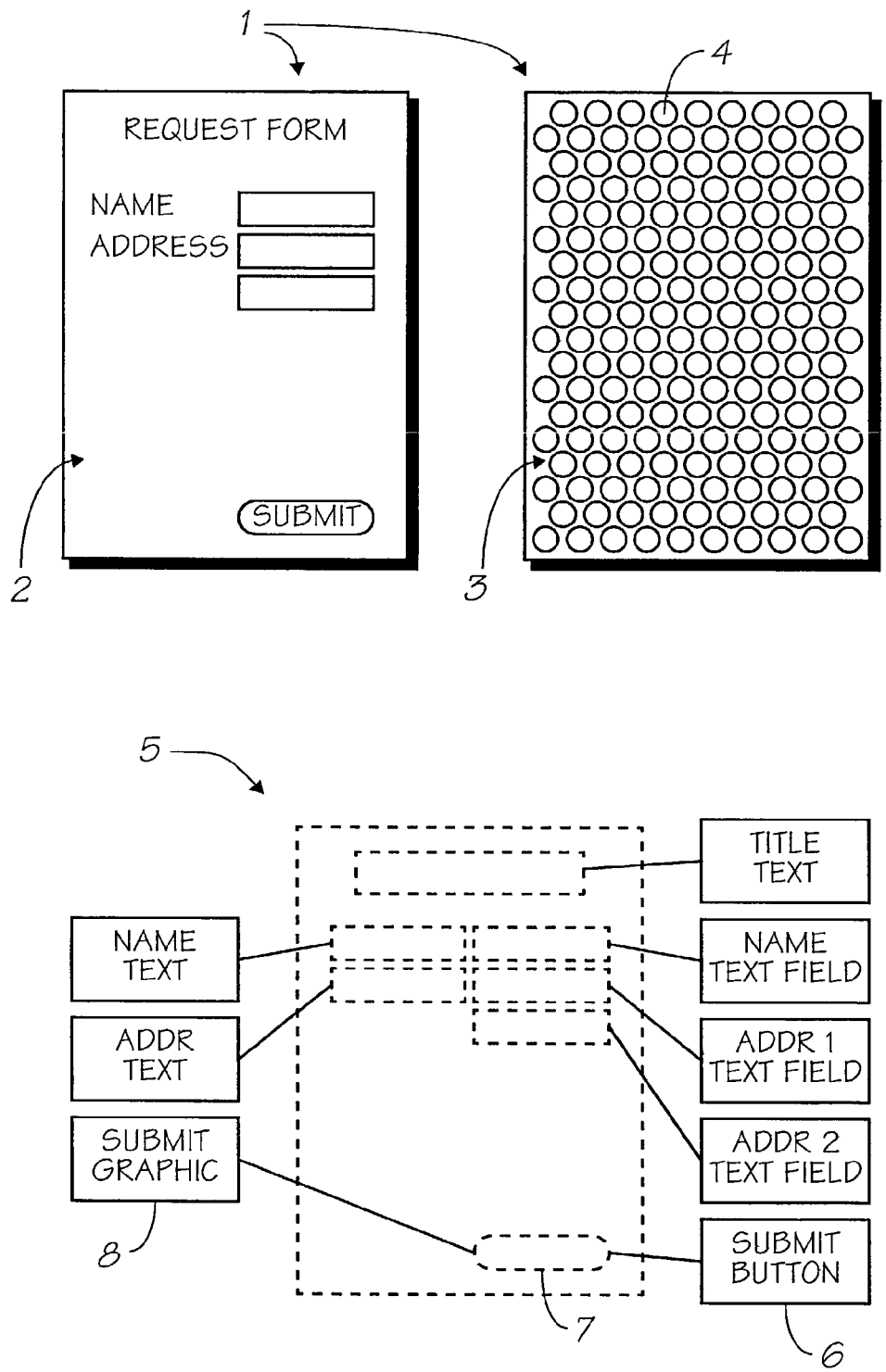
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
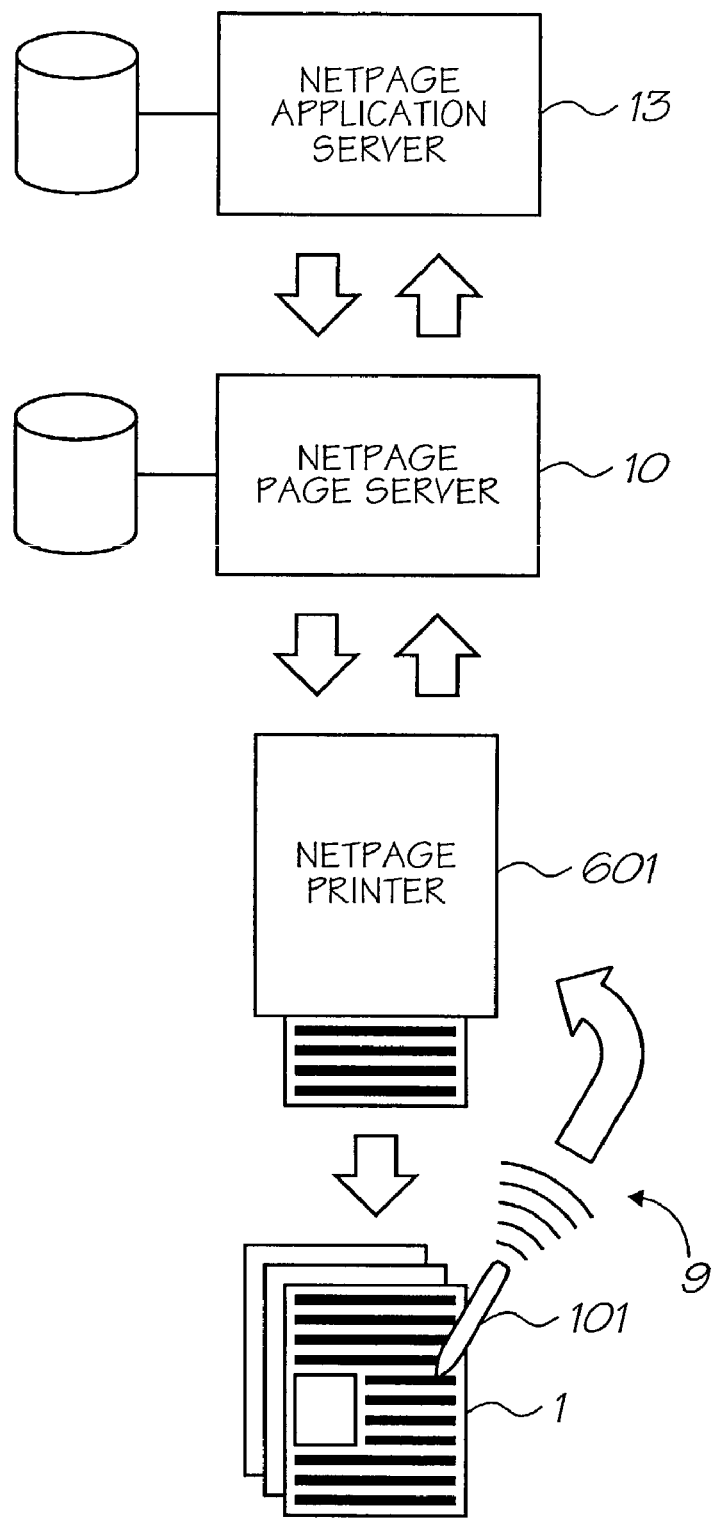
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Pat. No. 6,870,966, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier application U.S. Pat. No. 6,727,996 and our co-filed application U.S. Ser. No. 09/693,514, is able to deliver, periodically or on demand, personalized newspapers, magazines, catalogs, brochures and other publications, all printed at high quality as interactive netpages.

Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our earlier application U.S. Pat. No. 6,428,133. In the preferred form of this technology, relatively high-speed and high-quality printing is made more affordable to consumers. In its preferred form, a netpage publication has the physical characteristics of a traditional newsmagazine, such as a set of letter-size glossy pages printed in fill color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper.

Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
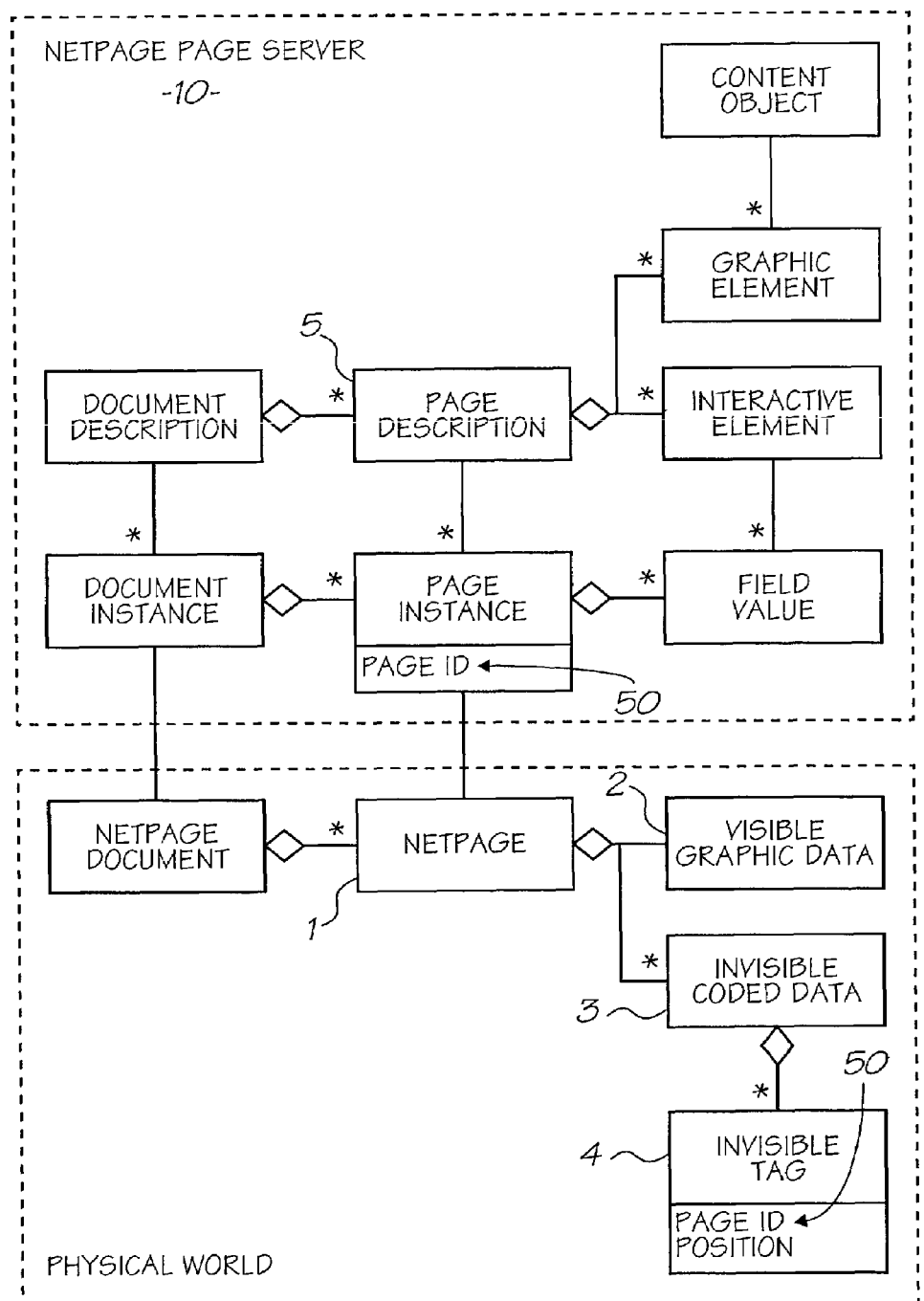
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ ($\sim 10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
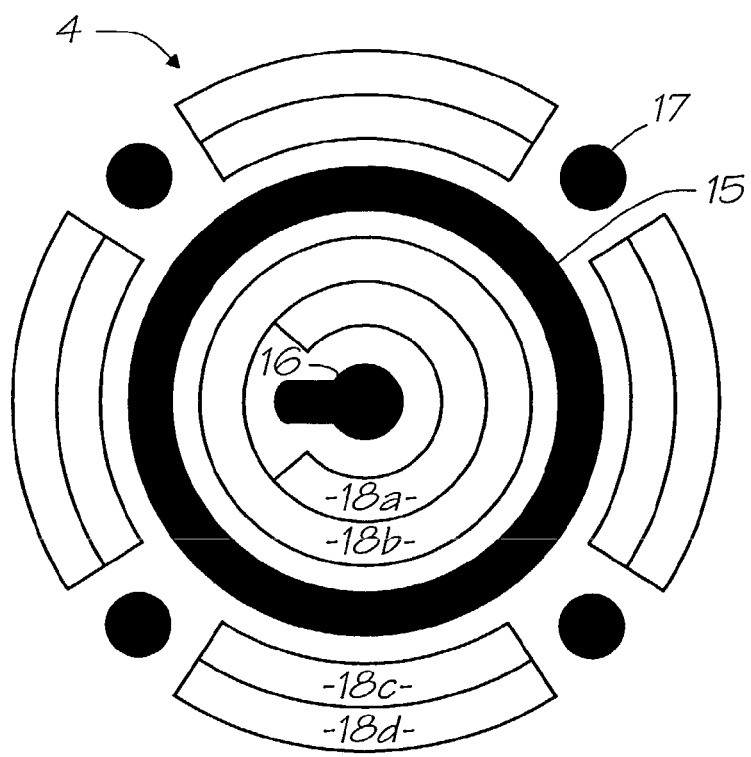
FIG. 4a is a plan view showing a structure of a netpage tag.

One embodiment of the physical representation of the tag, shown in FIG. 4a and described in our earlier application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
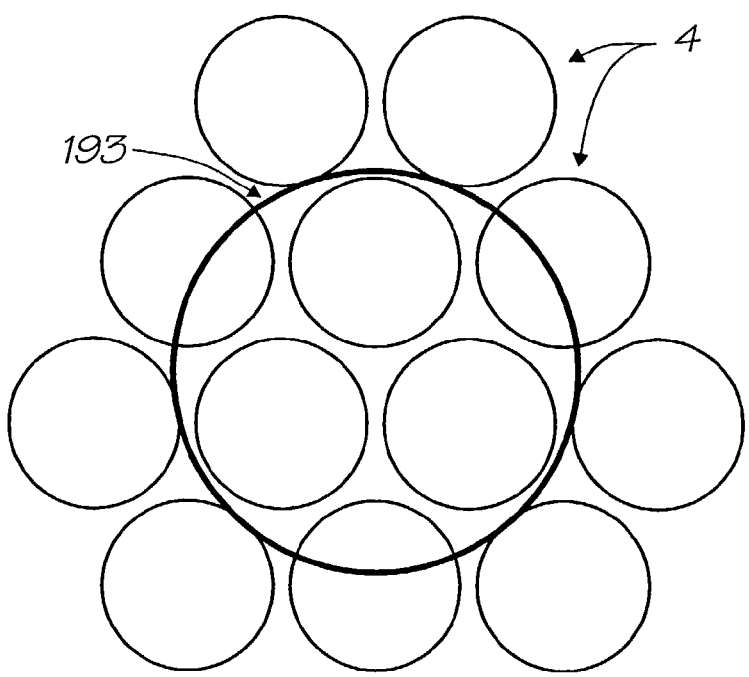
FIG. 4b is a plan view showing a relationship between a set of the tags shown in FIG. 4a and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
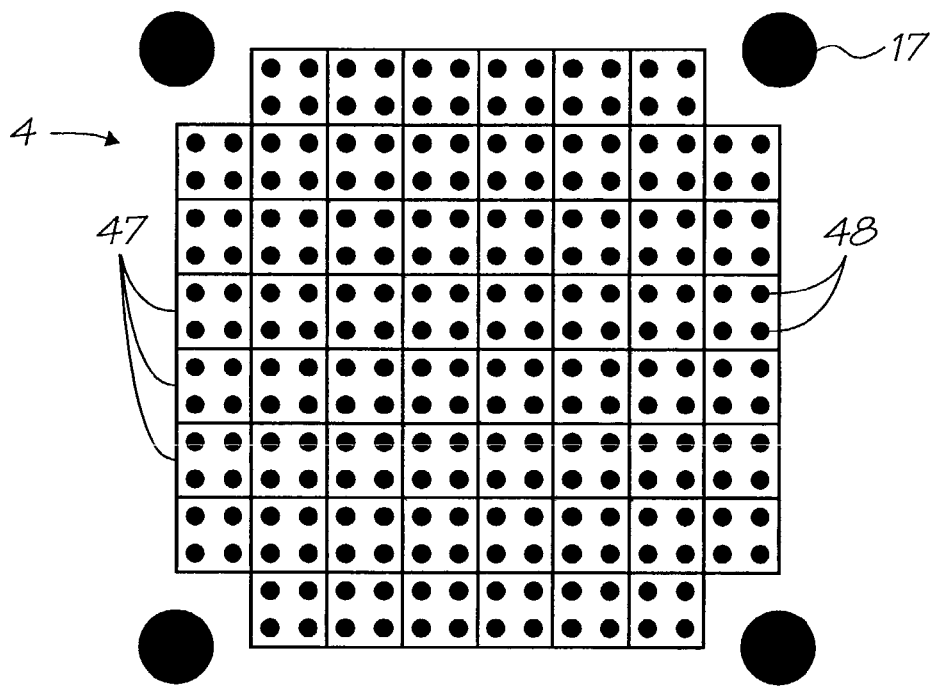
FIG. 5a is a plan view showing an alternative structure of a netpage tag.
Figure 5B:
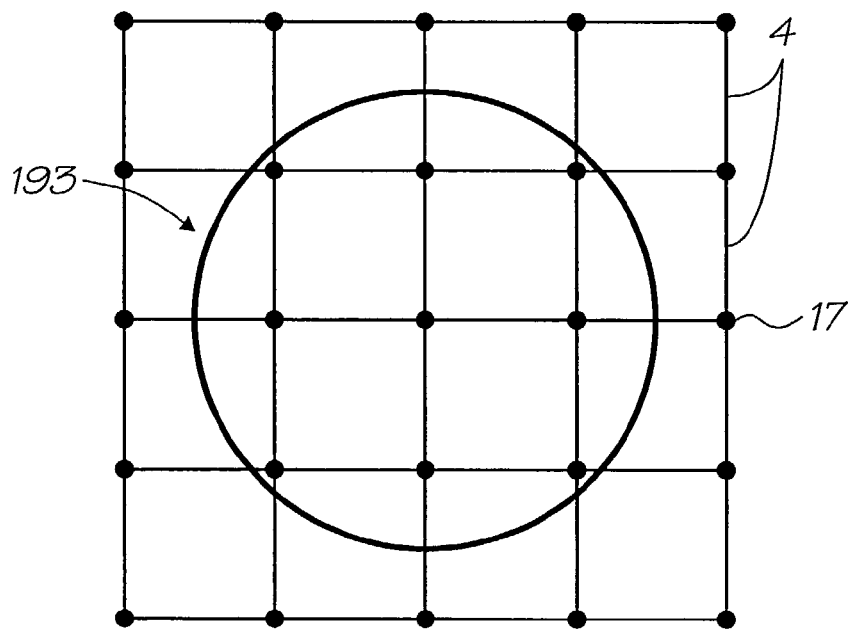
FIG. 5b is a plan view showing a relationship between a set of the tags shown in FIG. 5a and a field of view of a netpage sensing device in the form of a netpage pen.
Figures 5C, 5D:
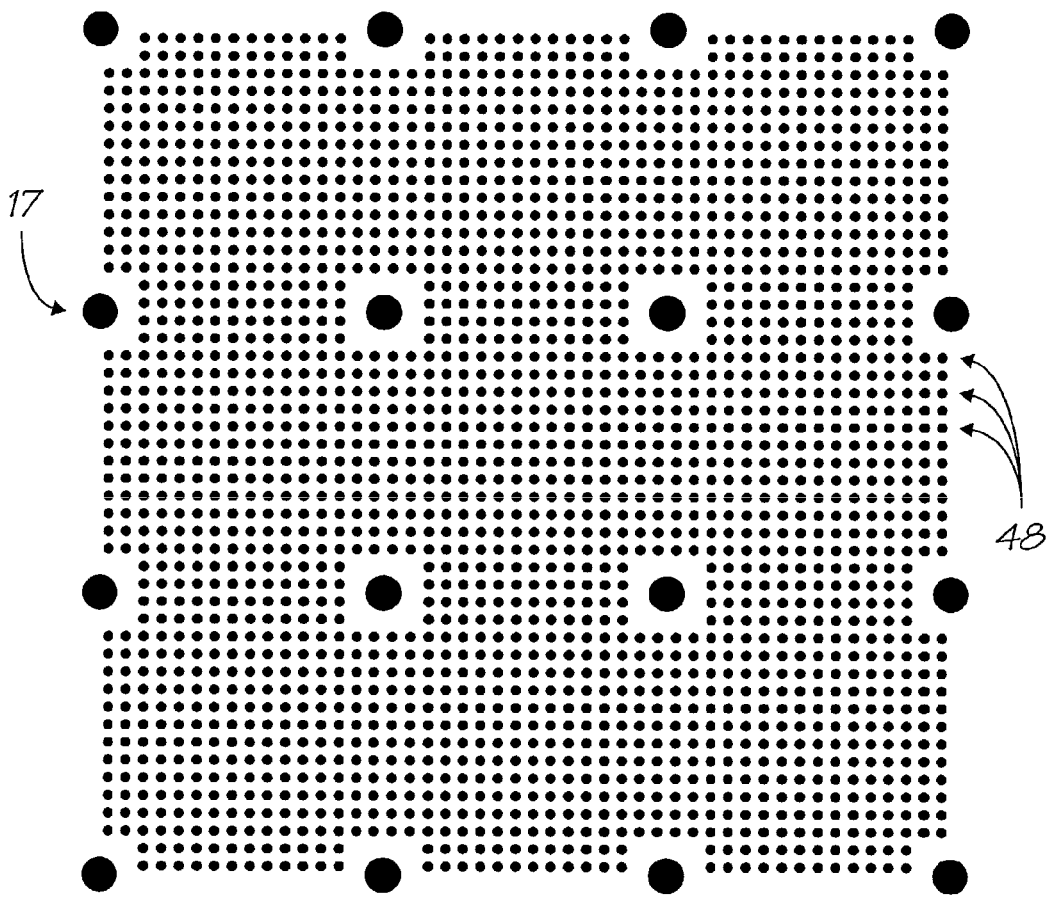

An alternative tag structure more suited to a regular tiling is shown in FIG. 5a. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded Cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Pat. No. 6,870,966.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

Figures 6, 7:
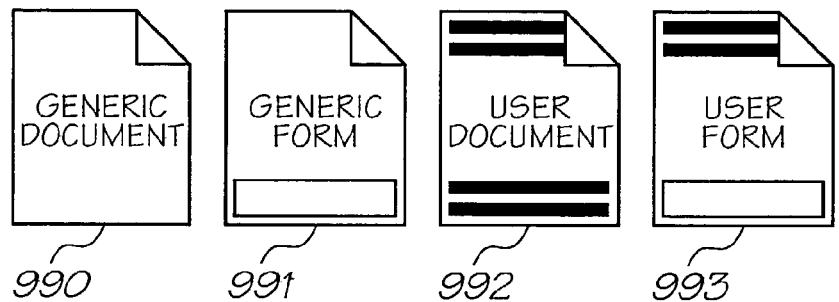
FIG. 6 is a schematic view of a set of user interface flow document icons.
FIG. 7 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 6 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 7, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Remote Conferencing Using The Netpage System

The netpage system, then, provides the facility for enabling remote conferencing, allowing geographically distributed participants to communicate graphical ideas via a shared whiteboard while engaged in a telephone conference or similar. Every time a participant adds a modification or a new piece of graphical information to the whiteboard the other participants are provided with an updated copy of the page. Each netpage or netpage document used during a conference session, such as a Conference Session Control Page (see below) or a version of a whiteboard which a participant is marking up, is a physical representation of what is referred to herein as a "conferencing form", containing the interactive objects (hyperlinks and form fields).

New whiteboard pages can be started at any time, but older pages or older versions of pages can still be marked up and re-distributed. Each participant ends up with a full history of the interaction.

Application Drawing Notation

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 44 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 45, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Conferencing Object Model

Figure 8:
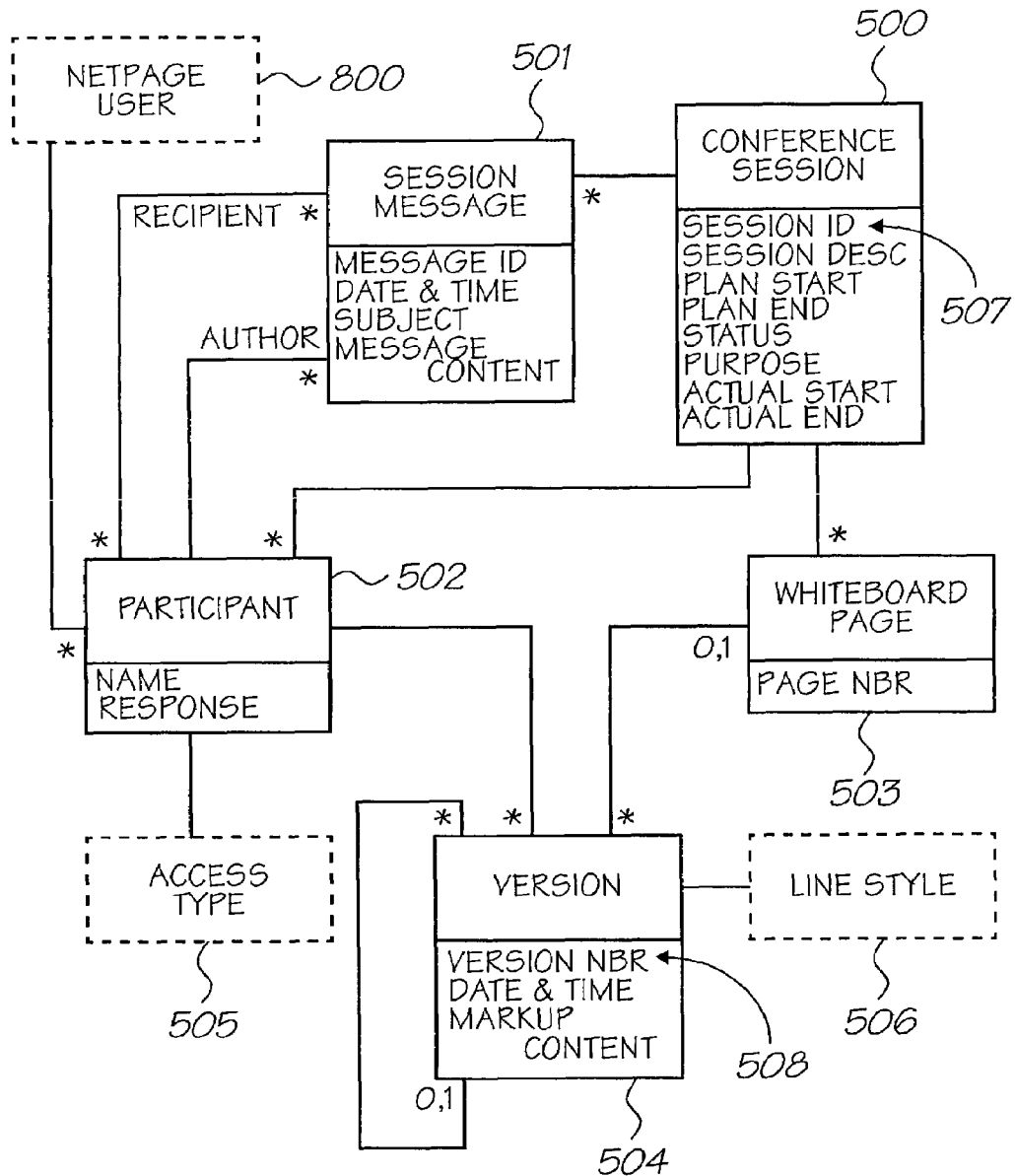
FIG. 8 is a class diagram representing a conferencing system according to the invention.

The conferencing object model revolves around a conference session, a set of versioned whiteboard pages, and session participants. The conferencing class diagram is shown in FIG. 8.

Figure 9:
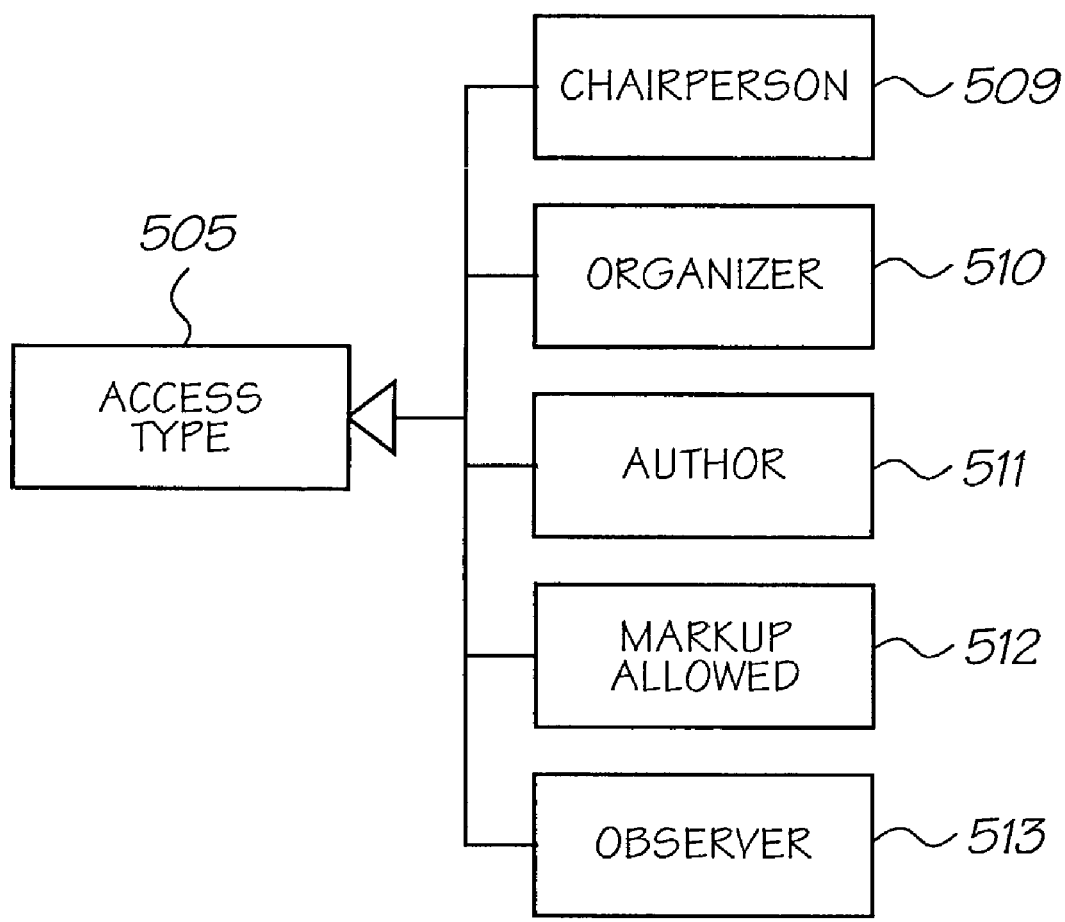
FIG. 9 is an access type class diagram.

Each conference participant 502 is a netpage user 800, and has an access type 505 for a session, controlling the functions to which they have access. The access type specifies, for example, whether a participant is merely an observer, or whether he/she is permitted to make page markups, send messages, etc. The possible access types are chairperson 509, organizer 510, author 511, markup allowed 512 and observer 513. The Access Type class diagram is shown in FIG. 9.

Each conference session 500 has a unique session identifier 507, a session description, a planned start and end time, an actual start and end time, comments, and a status (indicating if the session is booked, in progress, finished or cancelled).

Associated with a conference session is a conference whiteboard made up of whiteboard pages 503, each of which may have a number of versions 504 associated with it. A version 504 is uniquely identified by a version number 508. Each version has a line style 506.

Before a session begins the whiteboard is empty. As the session progresses participants create new whiteboard pages, or make markups to existing whiteboard pages. Each time a markup is made and submitted by a participant, a new version of that whiteboard page is created. Each version records the date and time the version was created, the user who made the markups, and the markup content. In addition, each page version is also linked to the version of the page that was marked up to create this version. In this way a "tree" of versions is created for each white-board page, recording all the markups made during the session.

Figure 10:
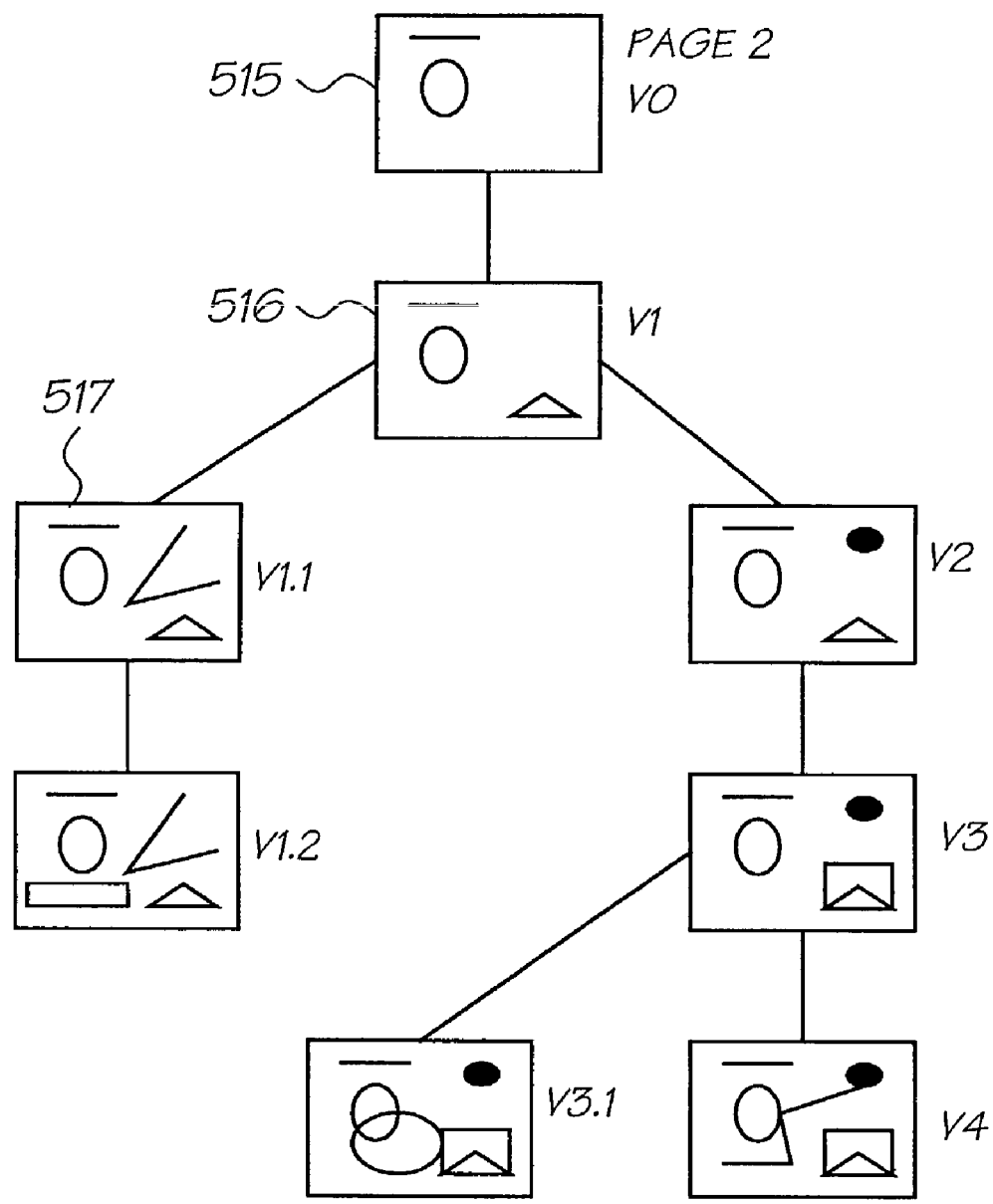
FIG. 10 illustrates the conferencing whiteboard page version numbering system.

The first whiteboard page version is version 0 515. If this version is modified, version 1 516 is created. If version 1 is modified, version 2 is created, and so on. This is called the 'main branch' of the tree. If, however, at some stage during the session a user modifies an older version of the page, then the version numbering system branches. If a user later modifies version 1 then the tree branches and a new version 1.1 517 is created. An example of this version numbering system is shown in FIG. 10. In this way, the evolution of each page (and thereby the information exchange process of the conference) can by clearly reviewed at any stage of the session.

Conferencing User Interface

Figure 11:
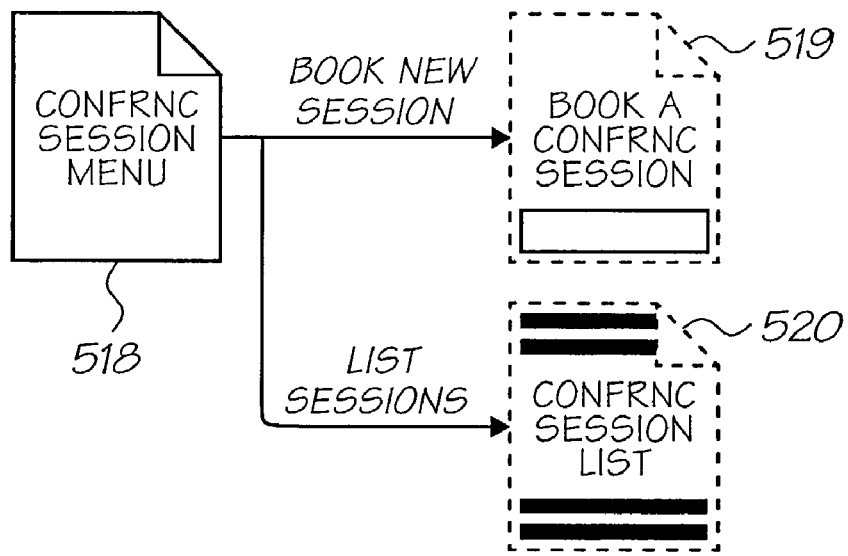
FIG. 11 illustrates the conference session menu user interface flow.

A user may obtain the Conference Session Menu 518 (not shown) from a variety of links including, for example:

a personalized bookmark kept by or available to the netpage user the help menu 46 of the user's netpage printer The Conference Session Menu user interface flow is shown in FIG. 11.

Optionally, security can be added to the conference session by adding signature verification at key points. A signature can be required, for example, on the session main page before a participant is allowed to send any markups.

Book a Conference Session

Figure 13:
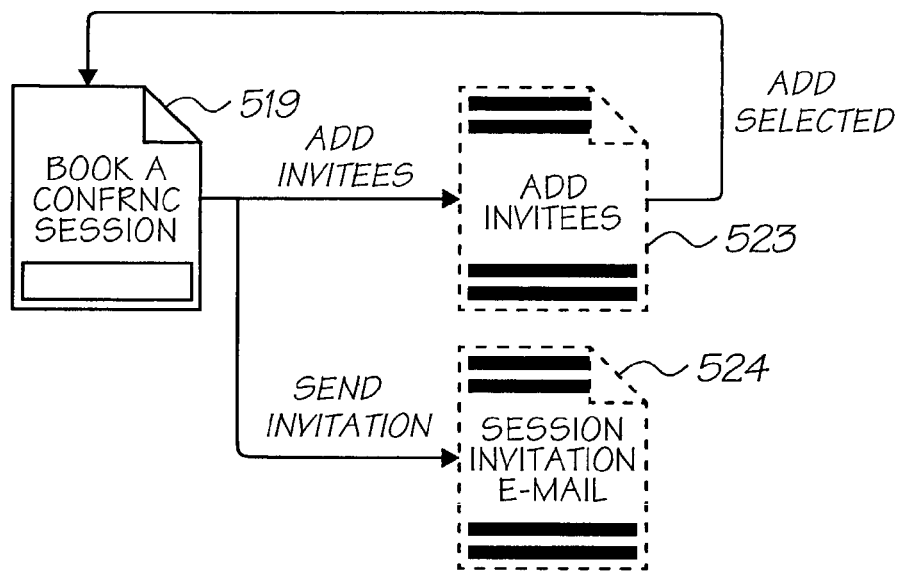
FIG. 13 illustrates the book conference session user interface flow.

A user may book a new conference session by clicking <Book New Session> on the Conference Session Menu 518. The Book A Conference Session page 519 is printed, shown in FIG. 16. The user who creates a new conference session is referred to as the 'organizer'. The Book Conference Session user interface flow is shown in FIG. 13.

To create a session the user specifies a short session description, the planned start date and time, and the planned end time for the session.

The user also specifies the participants to be invited to the session. One participant on the list may be flagged as the chairperson for the conference. If none is specified then, by default, the organizer is the chairperson. Participants may also be flagged as observers, observers having access types such that they may receive the whiteboard pages and all markups, but are not able to submit markups. The user may click the <Add Invitees> button 533 to obtain their contact list 523 (not shown) and select the participants.

Finally, for information purposes, the user may also include some comments relating to the session and its purpose.

When the details are complete the user clicks the <Send Invitation> button 534 to send the session invitation 524 to the participants via a netpage e-mail.

8.3.2 Conference Session List

The user can print a list of their conference sessions by selecting the <List Sessions> button from the Conference Session Menu 518. The Conference Session List 520 (not shown) shows all sessions in which the user is a participant. For each session the list shows the session description, the user's access type for that session, the start date and time for the session, and the session's status.

Figure 12:
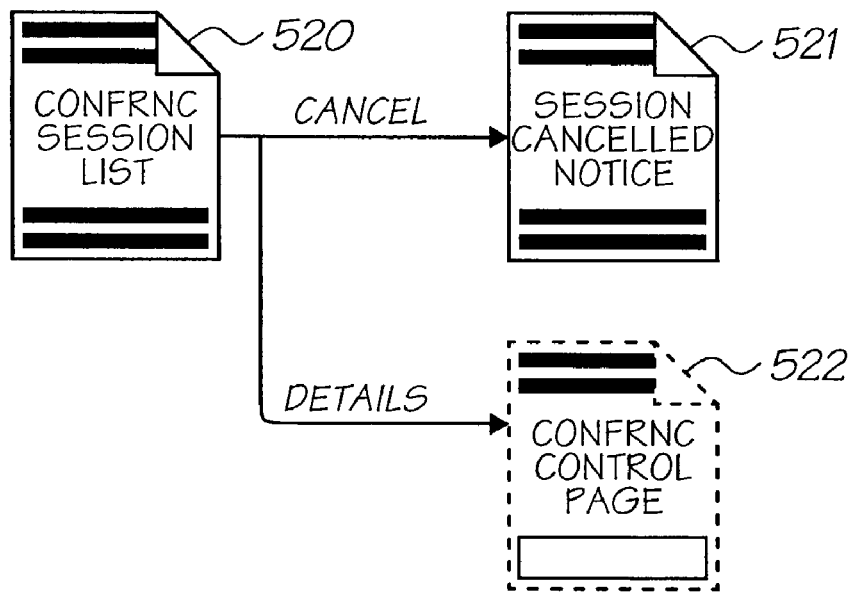
FIG. 12 illustrates the conference session list user interface flow.

The Conference Session List user interface flow is shown in FIG. 12. From the Conference Session List 520 the user can cancel a session by clicking the <Cancel> button, or click <Details> to see the full details of the session. If the user cancels a session a Session Cancelled Notice 521 (not shown) is sent to participants. If the session has not yet started, selecting <Details> prints a Conference Session Control Page 522 (see below). The session action buttons <Start Session> and <End Session> are only printed if the user is the meeting chairperson.

Conference Session Control

A user may start a conference session by selecting <Details> for the session from the Session List. If the session has not yet started then the Conference Session Control Page 522 is printed, shown in FIG. 17. If the user is the session chairperson, all the session action buttons are printed.

Figure 18:
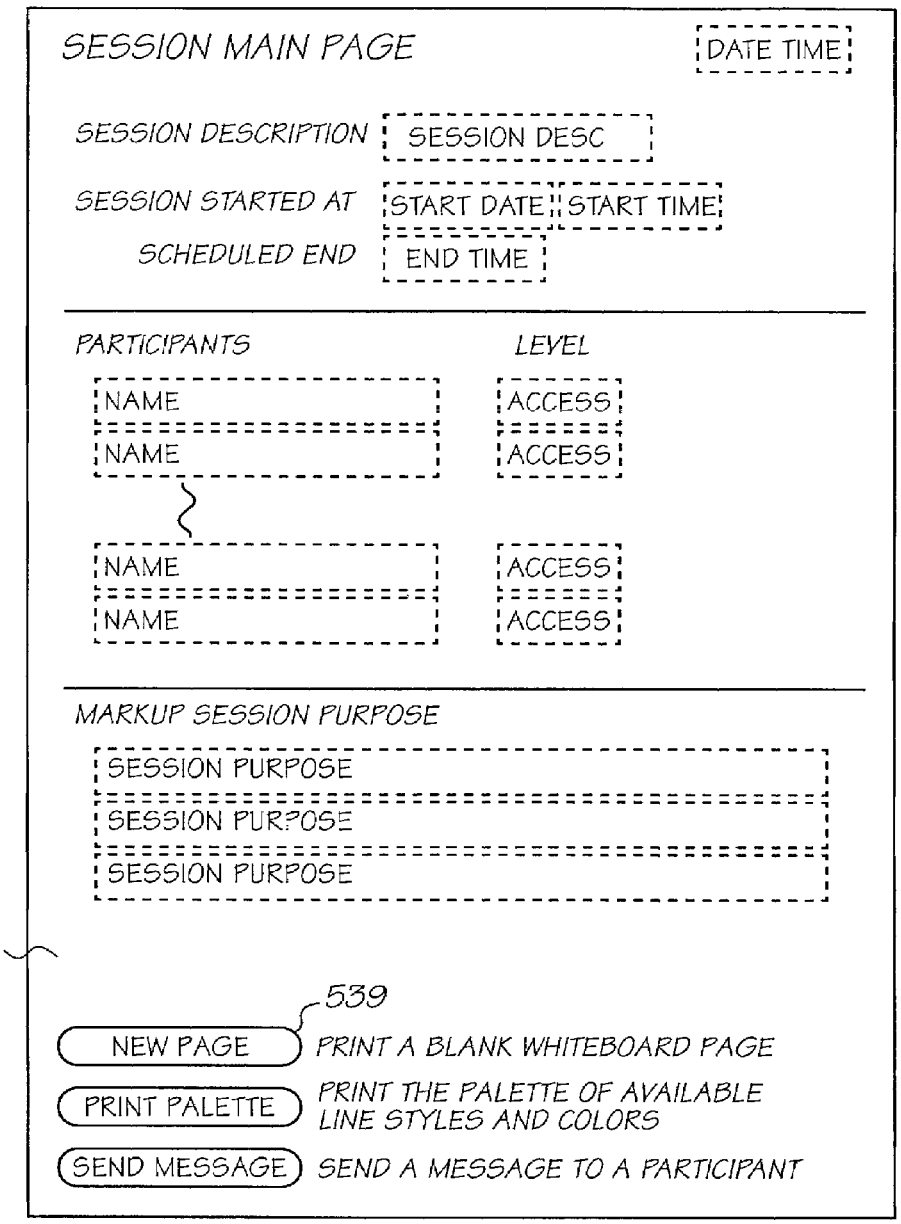
FIG. 18 shows the session main page.

The chairperson clicks <Start Session> 535 to begin the conference session, and a Session Main Page 526 is printed on the netpage printer of each participant (FIG. 18). The conference session then proceeds.

The chairperson clicks <End Session> 536 to end the current conference session. After this no more page markups can be submitted by the participants, and a Conference Session End Notice 532 is sent to all participants, shown in FIG. 20.

At any time during or after a conference session, the chairperson may view the history 525 of the whiteboard markups by clicking <View History> 537. The tree view of page versions is printed, with each version being shown as a thumbnail image together with its version number and the name of the user who created it. The chairperson can then print a full size copy of the page version by clicking on it.

At any time during or after a markup session, a user may list messages sent during the session. The message list 528 only shows messages which were addressed to the user.

A Conference Session

Figure 15:
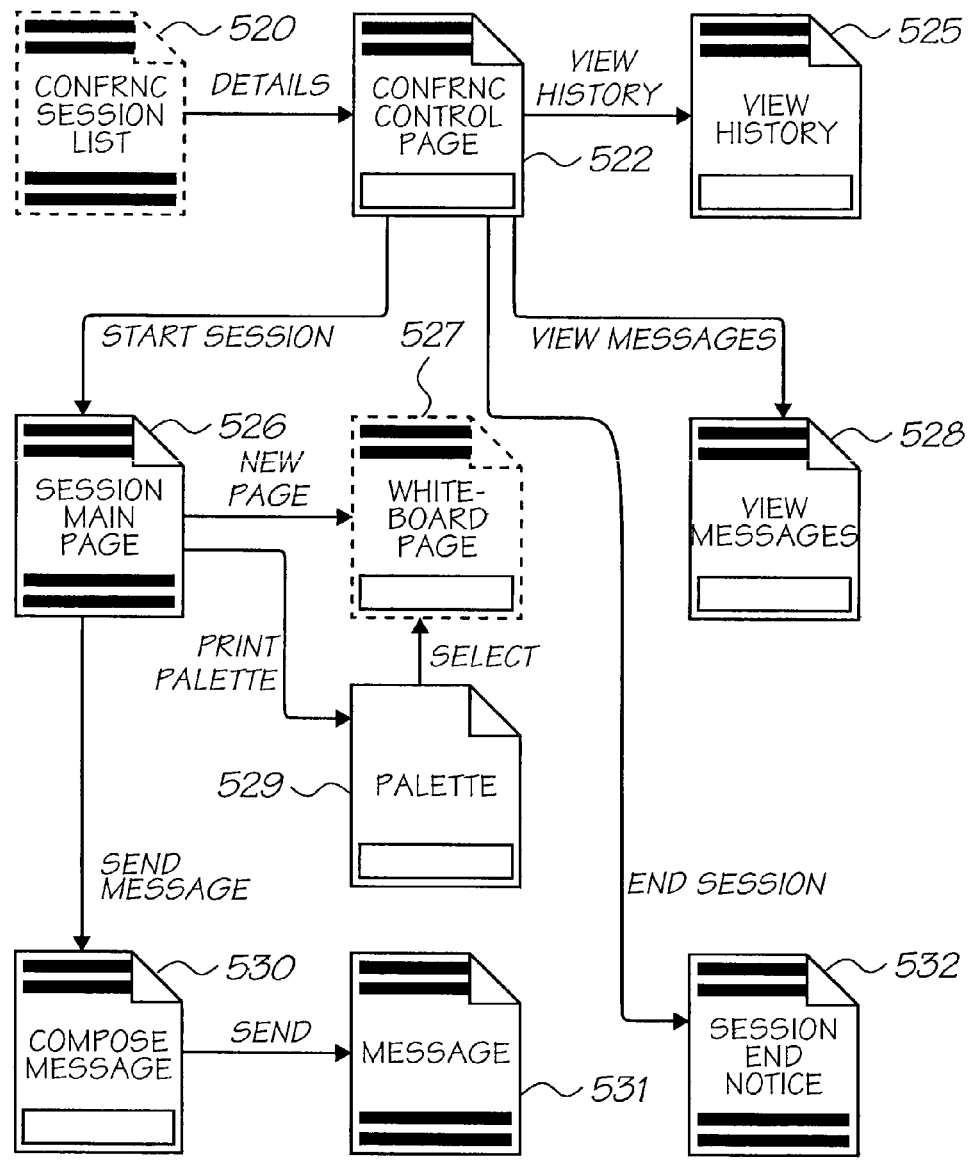
FIG. 15 presents an overall illustration of the user interface flow for a conference session.

The user interface flow for a conference session is shown in FIG. 15.

As explained above, when the session is started by the chairperson a Session Main Page 526 is printed on the netpage printer of each participant. The Session Main Page, shown in FIG. 18, gives the session details, the participants' names and access types.

If the user clicks the <New Page> 539 button on the Session Main Page, a blank whiteboard page (FIG. 19) is printed.

If the user clicks the <Print Palette> button on the Session Main Page, a palette 529 (not shown) of available line styles and colors is printed. The user can select the line style and color to use when writing on the whiteboard page. The palette choice can be changed at any time during the session. The current line style and color becomes a property of any captured digital ink.

During a session a participant can send a message 531 to the other participants, the message 531 printing directly onto the netpage printer of the addressees. The messages are recorded against the conference session, and may be printed at any time during or after the session, but messages can of course only be viewed by the message addressees. To send a message the user clicks the <Send Message> button and the Compose Message page 530 is printed, as shown in FIG. 21.

Figure 19:
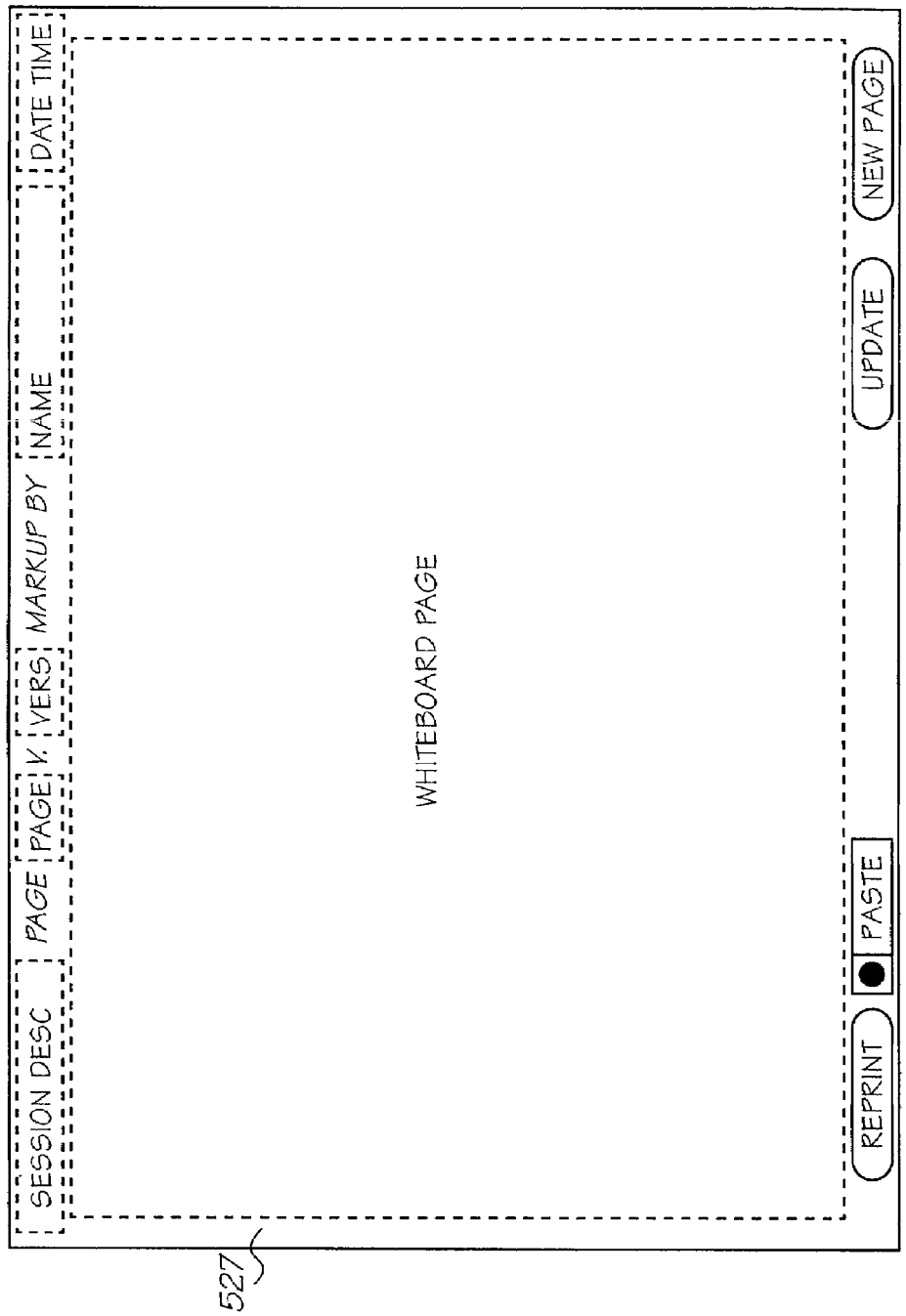
FIG. 19 shows a printed blank whiteboard page.

The whiteboard page 527 is shown in FIG. 19. The top of the whiteboard page shows the session description, whiteboard page number, version number, the current date and time, and the name of the participant who made the latest markups.

The page version may be reprinted, discarding any markups made on the page by the user, by clicking the <Reprint> button.

The user can select content on another netpage using an available netpage selection mechanism (e.g. by 'lassoing' and selecting the desired content from another netpage with the netpage pen). The user can then paste the selected content to the whiteboard page by drawing a line from the <Paste> icon to the desired paste point on the page.

If at any stage the user clicks the <Update> button then their marked-up whiteboard page is stored as a new version and is sent to all session participants.

If the user clicks the <New Page> button a blank whiteboard page is printed on their printer, as shown in FIG. 19.

Figure 14:
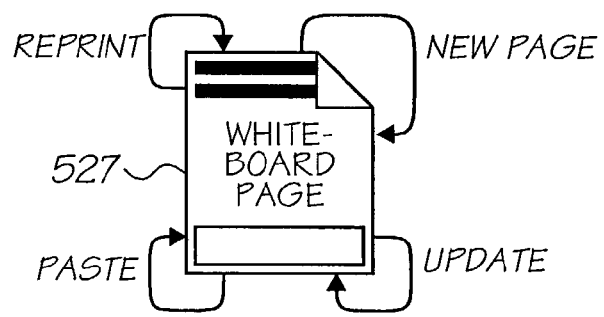
FIG. 14 illustrates the user interface flow for a whiteboard page.

The user interface flow for a whiteboard page is shown in FIG. 14, whilst the user interface flow for a conference session is shown in FIG. 15.

The tree view of page versions is printed on the back of each whiteboard page. If the entire tree does not fit on one page then as much as possible of the current branch is shown. Each version is shown as a thumbnail image, and beside the image is the version number and the update user name. The user can then print a full size copy of the page version by clicking on it.

As explained above, once the chairperson has ended a current conference session, no more page markups can be submitted by the participants, and a Conference Session End Notice 532 (FIG. 20) is sent to all participants.

Whiteboard Sessions Using The Netpage System

Additionally, then, the netpage system can be employed in the provision of a whiteboard facility for users in an educational or meeting environment who are not geographically remote from one another.

Netpage Whiteboard Pad Application

An easel holding a pad of large-format (e.g. A1 or A0) pre-printed netpage paper acts as the whiteboard. Participants in a meeting can collaboratively mark up the physical pages, and at the end of the meeting can print out a reduced-size version of the whiteboard pages, such as an A4 version, conveniently bound and timestamped. Multiple colored netpage pens can be used during a session, and since each pen can inform the system of its color and style, the reduced pages can faithfully reproduce the colors used.

Figure 22:
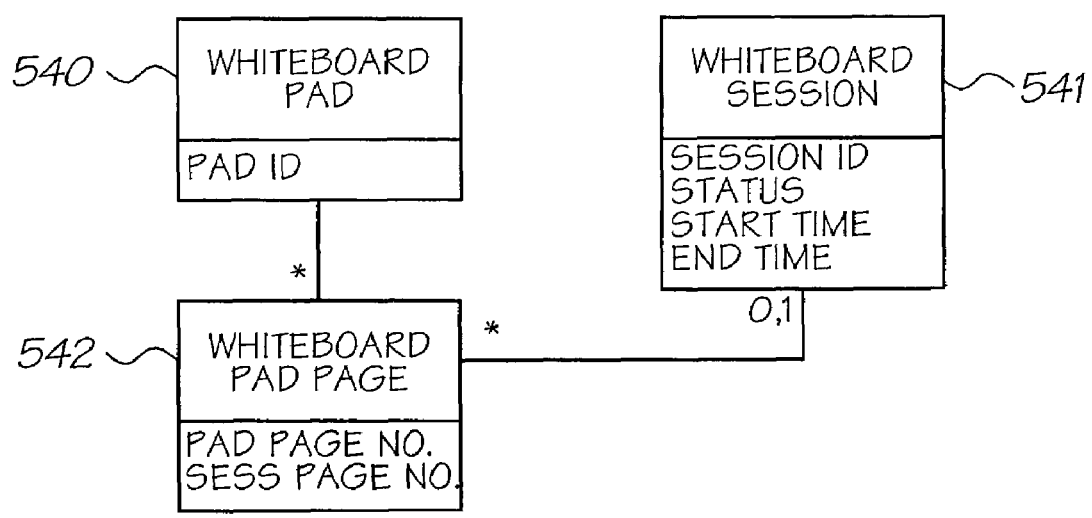
FIG. 22 is a class diagram representing a whiteboard pad and session.

The whiteboard pad application records each page of a pre-printed whiteboard pad as belonging to a particular pad, as shown in the Whiteboard Pad and Session class diagram in FIG. 22. When a user starts a new session 541, the application records the pad page 542 through which the user starts the session 541 as being the first page of the session. Any other pages belonging to the same pad 540 which are marked by a user using a netpage pen while the session is active are also recorded as belonging to the session.

Figure 23:
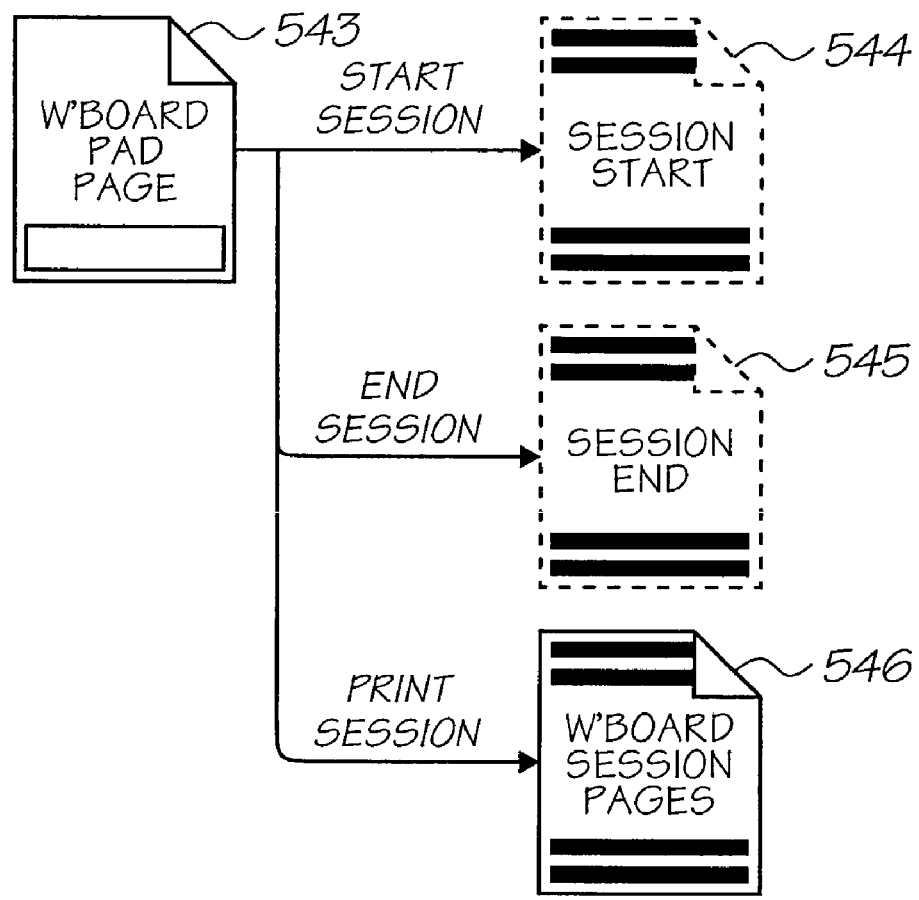
FIG. 23 illustrates a whiteboard pad session user interface flow.
Figure 24:
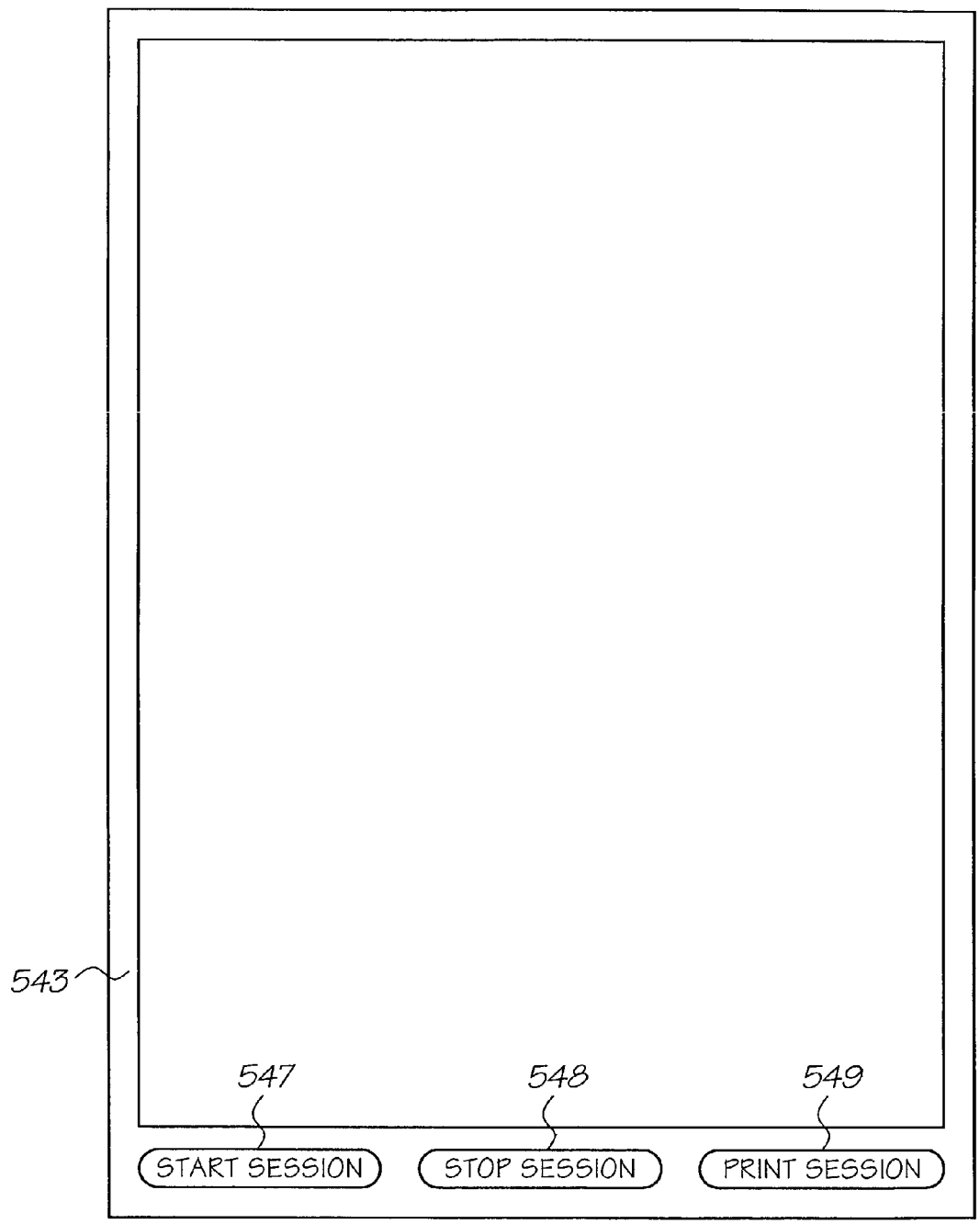
FIG. 24 shows a whiteboard pad page.

Each pad page 543 contains pre-printed buttons for starting, ending and printing a session, as shown in FIG. 24. As shown in the user interface flow in FIG. 23, when a user presses the <start session> button 547, the application prints a session start page 544 which gives the start time of the session. When a session is active in relation to a particular pad, any attempt to start a new session elicits an error report.

Alternatively or additionally, the application may be configured such that, if the user marks a pad page when no session is active, a new session is automatically started.

When the user presses the <end session> button 548, the application prints a session end page 545 which gives the start and end times of the session. When no session is active in relation to a particular pad, any attempt to end a session elicits an error report.

Figure 25:
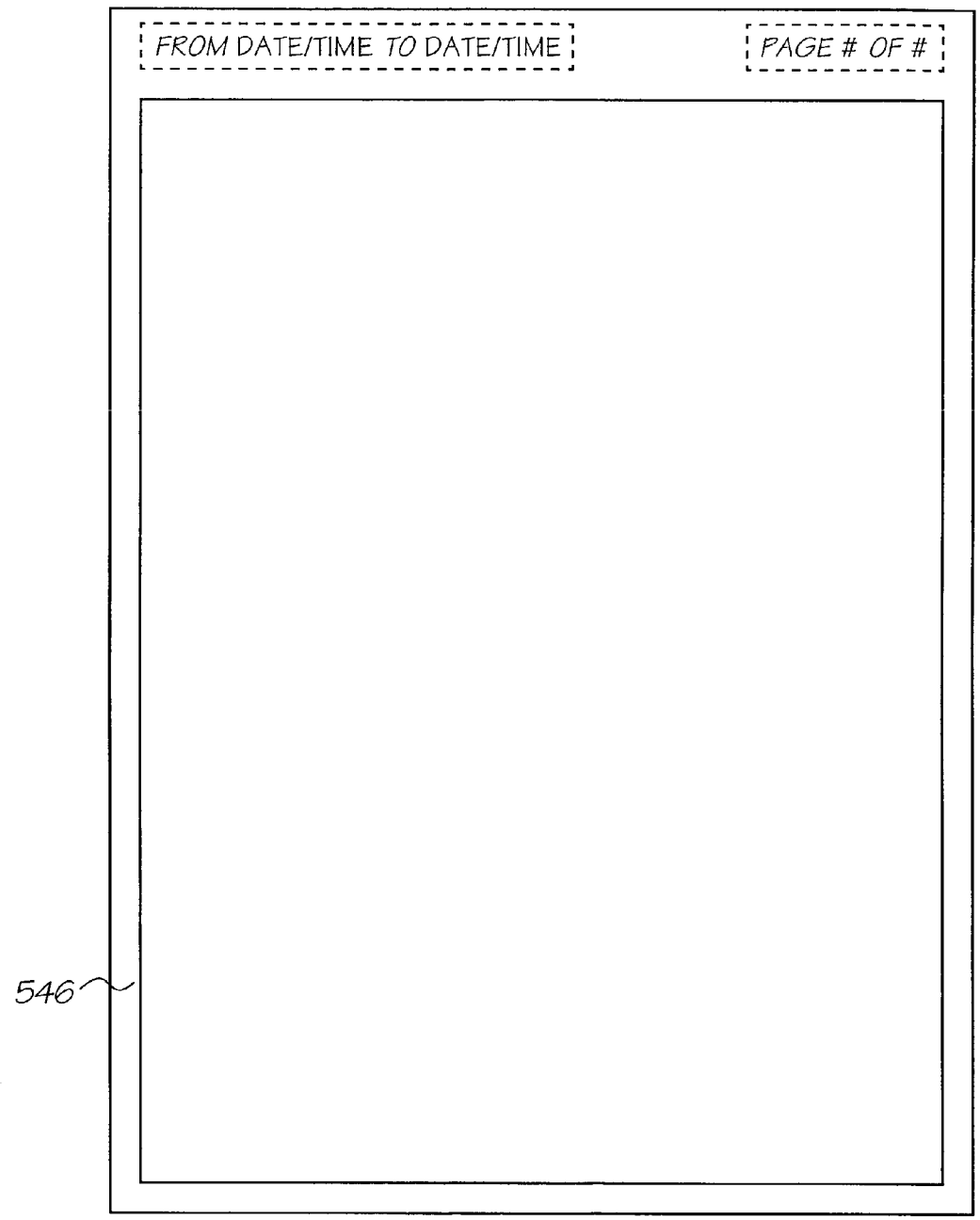
FIG. 25 shows a whiteboard session page.

Each pad page 543, as well as the session start page 544 and the session end page 545, provides a <print session> button 549 which can be used at any time to print the pages of the corresponding session. Each session page 546 is printed with the session start and end dates and times, as well as a page number within the session, as shown in FIG. 25.

As an alternative to the above, the whiteboard pad comprises essentially blank pages, preprinted with coded data for detection by the netpage pen, and the pad is provided on a cardboard or other backing sheet. The backing sheet extends beyond the periphery of the pages, for example below the bottom of the pages, to provide a projecting margin which includes a single set of session control buttons. These can be used to control any number of sessions held using the pad, although only one session at a time, of course. Because the whiteboard pad application knows which pad the control buttons belong to, it knows which pad, and therefore which session, the control buttons operate on.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A method of capturing, in a computer system, data relating to a note-taking session, the session including handwritten annotations made by a user by way of a writing implement on a plurality of pages, said pages including coded data indicative of at least one reference point of the page, said coded data comprising a plurality of substantially undifferentiated marks positioned relative to a set of predetermined nominal mark positions, wherein at least two of said plurality of pages include a control portion, wherein the control portion includes therein or thereon coded data indicative of at least one reference point of the control portion, the control portion comprising at least one control zone, the at least one control zone including a print zone, said writing implement including a sensor for detecting said coded data, and the method including the steps of:

receiving, in the computer system and via the writing implement, an indication of the start of the note-taking session;

receiving, in the computer system and via the writing implement, data indicative of said handwritten annotations made by said user on said plurality of pages;

receiving, in the computer system and via the writing implement, an indication of the end of the note-taking session;

retaining a retrievable record of the received data for the note-taking session;

in response to the indication of the end of the note-taking session and without further user intervention, printing a note-taking session end page indicating at least one of a start time and an end time of the note taking session; and receiving, in the computer system and via the writing implement, an indication of a request to selectively print said data of said handwritten annotations of the note-taking session, wherein the indication of the request to print is received from the writing implement capturing at least some of the coded data of the control portion when placed in an operative position relative to the print zone of the control portion.

2. The method according to claim 1, wherein each mark represents one of a plurality of coded values.

3. The method according to claim 2, wherein the coded value represented by a mark is at least partially determined by the position of the mark relative to the set of predetermined nominal mark positions.

4. The method according to claim 1, wherein the predetermined nominal mark positions are arranged relative to a plurality of nominal lines.

5. The method according to claim 4 wherein at least one pair of the lines are spaced apart from one another by a distance of less than 100 millimeters.

6. The method according to claim 1, wherein the marks have centers and wherein the relative spacing of the centers of at least one pair of adjacent marks is less than 12 millimeters.

7. The method according to claim 1, wherein any 10 millimeter diameter area of the coded data indicative of the at least one reference point of the page includes sufficient information to identify the at least one reference point.

8. A method according to claim 1, wherein each of the pages includes coded data indicative of an identity of the page, and said writing implement includes a sensor for detecting said coded data.

9. The method according to claim 8, wherein any 10 millimeter diameter area of the coded data indicative of the identity of the page includes sufficient information to identify the page.

10. A method according to claim 1, wherein said indication of the start of the note-taking session is provided by the computer system receiving data indicative of said handwritten annotations made by said user on said plurality of pages.

11. A method according to claim 1, wherein said plurality of pages are provided in the form of a notepad, the notepad includes said control portion on a part of the notepad other than on one of said pages.

12. A method according to claim 1, wherein said at least one control zone includes a zone associated with the start of the note-taking session, and said indication of the start of the note-taking session is provided by the computer system receiving an indication that said user has designated said zone by way of said writing implement capturing at least some of the coded data of the control portion when placed in an operative position relative to the zone associated with the start of the note-taking session.

13. A method according to claim 1, wherein said at least one control zone includes a zone associated with the end of the note-taking session, and said indication of the end of the note-taking session is provided by the computer system receiving an indication that said user has designated said zone by way of said writing implement capturing at least some of the coded data of the control portion when placed in an operative position relative to the zone associated with the end of the note-taking session.

14. A method according to claim 1, wherein said writing implement includes a writing nib, and said writing nib is associated with a sensor able to detect nib contact with one of said plurality of pages.

15. A method according to claim 1, the data being printable on a plurality of pages corresponding to the plurality of pages annotated in the note-taking session.

16. A system for capturing data relating to a note-taking session, the session including handwritten annotations made by a user by way of a writing implement on a plurality of pages, said pages including coded data indicative of at least one reference point of the page, said coded data comprising a plurality of substantially undifferentiated marks positioned relative to a set of predetermined nominal mark positions, wherein at least two of said plurality of pages include a control portion, wherein the control portion includes therein or thereon coded data indicative of at least one reference point of the control portion, the control portion comprising at least one control zone, the at least one control zone including a print zone, said writing implement including a sensor for detecting said coded data, and the system including:

a computer system for receiving indicating data via the writing implement operated by the user, said indicating data regarding at least one of a position and a movement of the writing implement relative to a page, the computer system including:

(a) a start/end-identifier for identifying, from the indicating data, an indication of the start of the note-taking session and an indication of the end of the note-taking session;

(b) a memory for retaining a retrievable record of the received data for the note-taking session, said retrievable record being indicative of said handwritten annotations made by said user on said plurality of pages between the start and end of the note-taking session;

(c) a controller to control a printer to print a note-taking session end page indicating at least one of a start time and an end time of the note-taking session in response to the received indication of the end of the note-taking session and without further user intervention;

(c) a print identifier for identifying, using at least some of the coded data of the control portion captured by the writing implement when placed in an operative position relative to the print zone of the control portion, a request to selectively print said data of said handwritten annotations of the note-taking session;

wherein at least two pages of the plurality of pages include a control portion comprising at least one control zone, the computer system receiving an indication via the writing implement that the user has designated one or more control zones using the writing implement.

17. A system according to claim 16, including the plurality of pages.

18. A system according to claim 17, wherein each page includes coded data indicative of an identity of the page, and said indicating data being indicative of both the position of the writing implement relative to a page and the identity of the page.

19. The system according to claim 18, wherein any 10 millimeter diameter area of the coded data indicative of the identity the page includes sufficient information to identify the page.

20. A system according to claim 16, wherein said indicating data regarding at least one of the position and the movement of the writing implement relative to a page is generated by the writing implement upon sensing at least some of the coded data.

21. The system according to claim 16, wherein each mark represents one of a plurality of coded values.

22. The system according to claim 21, wherein the coded value represented by a mark is at least partially determined by the position of the mark relative to the set of predetermined nominal mark positions.

23. The system according to claim 16, wherein the predetermined nominal mark positions are arranged relative to a plurality of nominal lines.

24. The system according to claim 23 wherein at least one pair of the lines are spaced apart from one another by a distance of less than 100 millimeters.

25. The system according to claim 16, wherein the marks have centers and wherein the relative spacing of the centers of at least one pair of adjacent marks is less than 12 millimeters.

26. The system according to claim 16, wherein any 10 millimeter diameter area of the coded data indicative of the at least one reference point of the page includes sufficient information to identify the at least one reference point.

27. A system according to claim 16 including a writing implement which includes a sensor for detecting said coded data.

28. A system according to claim 27, wherein said writing implement includes a writing nib, and said writing nib is associated with a sensor able to detect nib contact with one of said plurality of pages.

29. A system according to claim 16 including at least one notepad incorporating said plurality of pages, the at least one notepad including said control portion on a part of the notepad other than on one of said pages.

30. A system according to claim 16, wherein said at least one control zone includes a session start zone, said means for identifying an indication of the start of the note-taking session comprises means for receiving an indication that said user has designated said zone by way of said writing implement capturing at least some of the coded data of the control portion when placed in an operative position relative to the zone associated with the start of the note-taking session.

31. A system according to claim 16, wherein said at least one control zone includes a session end zone, said means for identifying an indication of the end of the note-taking session comprises means for receiving an indication that said user has designated said zone by way of said writing implement capturing at least some of the coded data of the control portion when placed in an operative position relative to the zone associated with the end of the note-taking session.

* * * * *